(12) United States Patent
Chou

(10) Patent No.: US 8,237,855 B2
(45) Date of Patent: Aug. 7, 2012

(54) CAMERA DEVICE CAPABLE OF SYNCHRONOUSLY SHOOTING IMAGES INSIDE AND OUTSIDE A CAR

(75) Inventor: Rong-Her Chou, Yu-Lin Hsien (TW)

(73) Assignee: Tech-Cast Mfg. Corp., Yu-Lin Hsien (TW)

( * ) Notice: Subject to any disclaimer, the term of this patent is extended or adjusted under 35 U.S.C. 154(b) by 783 days.

(21) Appl. No.: 12/425,178

(22) Filed: Apr. 16, 2009

(65) Prior Publication Data

US 2010/0265328 A1 Oct. 21, 2010

(51) Int. Cl.
*H04N 5/225* (2006.01)
*H04N 7/18* (2006.01)

(52) U.S. Cl. ........................ 348/373; 348/148

(58) Field of Classification Search .............. 348/148, 348/143, 151, 153, 373, 374, 375; 396/427
See application file for complete search history.

(56) References Cited

U.S. PATENT DOCUMENTS

| | | | | |
|---|---|---|---|---|
| 5,978,017 | A * | 11/1999 | Tino | 348/148 |
| 6,151,065 | A * | 11/2000 | Steed et al. | 348/148 |
| 6,795,111 | B1 * | 9/2004 | Mazzilli | 348/148 |
| 6,811,330 | B1 * | 11/2004 | Tozawa | 396/428 |
| 7,609,961 | B2 * | 10/2009 | Park | 396/429 |
| 7,811,010 | B2 * | 10/2010 | Yamashita | 348/143 |
| 7,965,336 | B2 * | 6/2011 | Bingle et al. | 348/374 |
| 2004/0145457 | A1 * | 7/2004 | Schofield et al. | 340/425.5 |
| 2005/0206780 | A1 * | 9/2005 | Iwasaki et al. | 348/373 |
| 2005/0238345 | A1 * | 10/2005 | Hsieh | 396/427 |
| 2007/0237517 | A1 * | 10/2007 | Park | 396/427 |
| 2009/0273673 | A1 * | 11/2009 | Worley et al. | 348/148 |
| 2009/0289811 | A1 * | 11/2009 | Chou | 340/901 |
| 2010/0060734 | A1 * | 3/2010 | Chou | 348/148 |
| 2010/0100276 | A1 * | 4/2010 | Fujinawa et al. | 701/33 |
| 2010/0265328 | A1 * | 10/2010 | Chou | 348/143 |
| 2010/0328464 | A1 * | 12/2010 | Chou | 348/149 |
| 2011/0032416 | A1 * | 2/2011 | Naito et al. | 348/374 |
| 2011/0285850 | A1 * | 11/2011 | Lu et al. | 348/148 |
| 2012/0026330 | A1 * | 2/2012 | Huelsen et al. | 348/148 |

* cited by examiner

*Primary Examiner* — Aung S Moe
(74) *Attorney, Agent, or Firm* — WPAT, PC; Justin King

(57) ABSTRACT

A camera device includes a case having a first camera and a second camera arranged therein. The case is assembled from a first and a second half-case. The first camera is used to shoot images of the driver inside a car and the second camera is used to shoot images of the road in front of the car. The camera device also includes a mounting mechanism that allows adjustment of the case of the camera device to different orientations. Therefore, when the camera device is installed in a car, the first and second cameras can be adjusted to a desired shooting angle and images inside and outside the car can be synchronously shot and be used in an accident to determine which party should be responsible for the accident.

8 Claims, 12 Drawing Sheets

CAMERA DEVICE CAPABLE OF SYNCHRONOUSLY SHOOTING IMAGES INSIDE AND OUTSIDE A CAR

FIELD OF THE INVENTION

The present invention relates to a camera device capable of synchronously shooting images inside and outside a car. The camera device is installed in a car and includes two cameras for shooting images of the driver in the car and images of the road in front of the car, so that the shot images can be used as a driving safety record to help in determining the party that should be responsible for in a traffic accident.

BACKGROUND OF THE INVENTION

A camera used in a security and surveillance system must be adjustable to different shooting angles. A camera system installed on a bus or other large-size vehicles usually includes a camera for shooting images in the bus and a reversing camera for taking pictures during reversing, and both of these two cameras are adjustable in their shooting angles. After the cameras have been adjusted to the desired shooting angles, they are locked in place on the bus using screws.

Following the progress and development of the modern society, the traffic in cities has become more and more complicated. However, there are many people, including drivers and walkers, not following the traffic rules in the environment crowded with cars. As a result, there are accidents of different seriousness occurring everyday. According to investigations, most of the parties in traffic accidents can hardly remember how the accident occurred. Under this circumstance, it is often very difficult to clarify and determine who should be responsible for the accident and indemnify for loss and damage. In a lucky case, the accident is recorded by a nearby surveillance camera, and it will be easier to clarify who should be responsible for the accident. Lacking such video recorded images as evidence, it would be much harder for the police to correctly find out the truth just by measuring the accident site and inferring the possible reasons. Particularly when there is someone being killed in the accident, it would be unfair and unreasonable to determine the responsibility simply by relying on the survivor's argument. And, even if the survivor's argument is true, it is not necessarily accepted by the families of the dead or the public. That is why many traffic accidents eventually involve in longstanding and weary lawsuit and negotiation for indemnity, and form a spiritual and physical burden for both parties. Therefore, it is really necessary to install a camera device on a car for shooting images of the car during driving to help in finding out the causes of an accident. Moreover, when the images of the driver during driving and the images of road in front the car are synchronously shot, it will be easier to determine the party who should be responsible for the accident.

In view that it is uneasy to find out the cause of an accident and determine which party should be responsible for the accident with the conventional cameras mounted on a car, the inventor has developed a shooting angle adjustable camera device for synchronously shooting images inside and outside a car, particularly the driver's physical and spiritual condition during driving and the road condition in front of the car, so as to help in recreating the site of an accident.

SUMMARY OF THE INVENTION

A primary object of the present invention is to provide a camera device capable of synchronously shooting images of a driver inside a car and images of a road in front of the car, so that the shot images can be used in an accident to determine which party should be responsible for the accident.

Another object of the present invention is to provide a camera device that is capable of synchronously shooting images inside and outside a car, and can be easily and accurately adjusted to the most suitable shooting angle without the need of using any tool.

To achieve the above and other objects, the camera device according to the present invention is mounted in a car for shooting images inside and outside the car, and includes a case, a first camera, and a second camera. The case is assembled from a first and a second half-case, and the first and the second camera are arranged in the case for acquiring images inside the car and images of road in front of the car, respectively.

The first half-case is provided with a first through opening, and the second half-case is provided with a second through opening. The lens of the first camera is protruded from the first half-case via the first through opening, and the lens of the second camera is protruded from the second half-case via the second through opening.

The camera device of the present invention further includes a mounting mechanism, which allows adjustment of the case to a desired shooting angle and direction. The mounting mechanism includes a mount and a tightening member. The mount is connected at an end to the car and at the other end to the case. The tightening member can lock the case in place when the case has been set to an adjusted position relative to the mount.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 5:
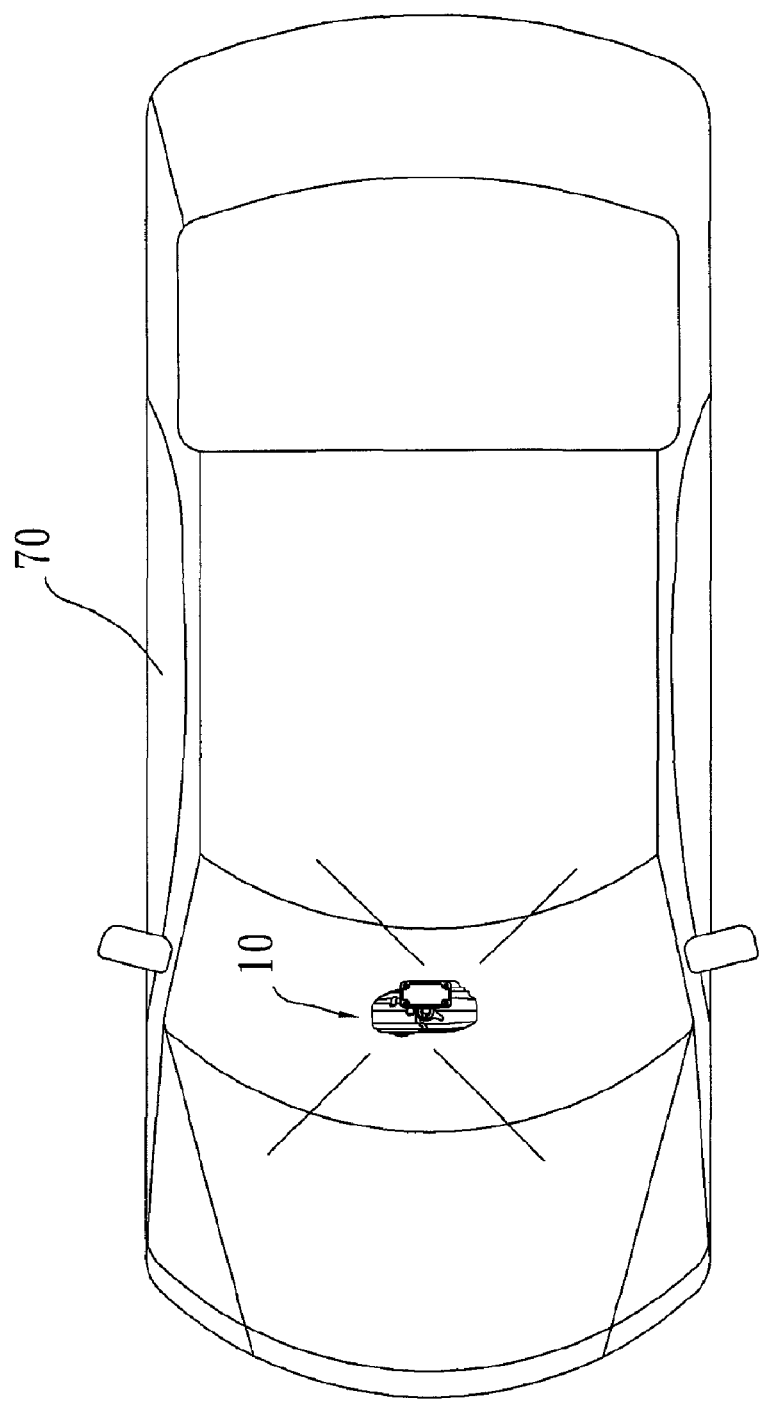
FIG. 5 is a schematic top view showing the camera device of the present invention being mounted in a car.
Figure 6:
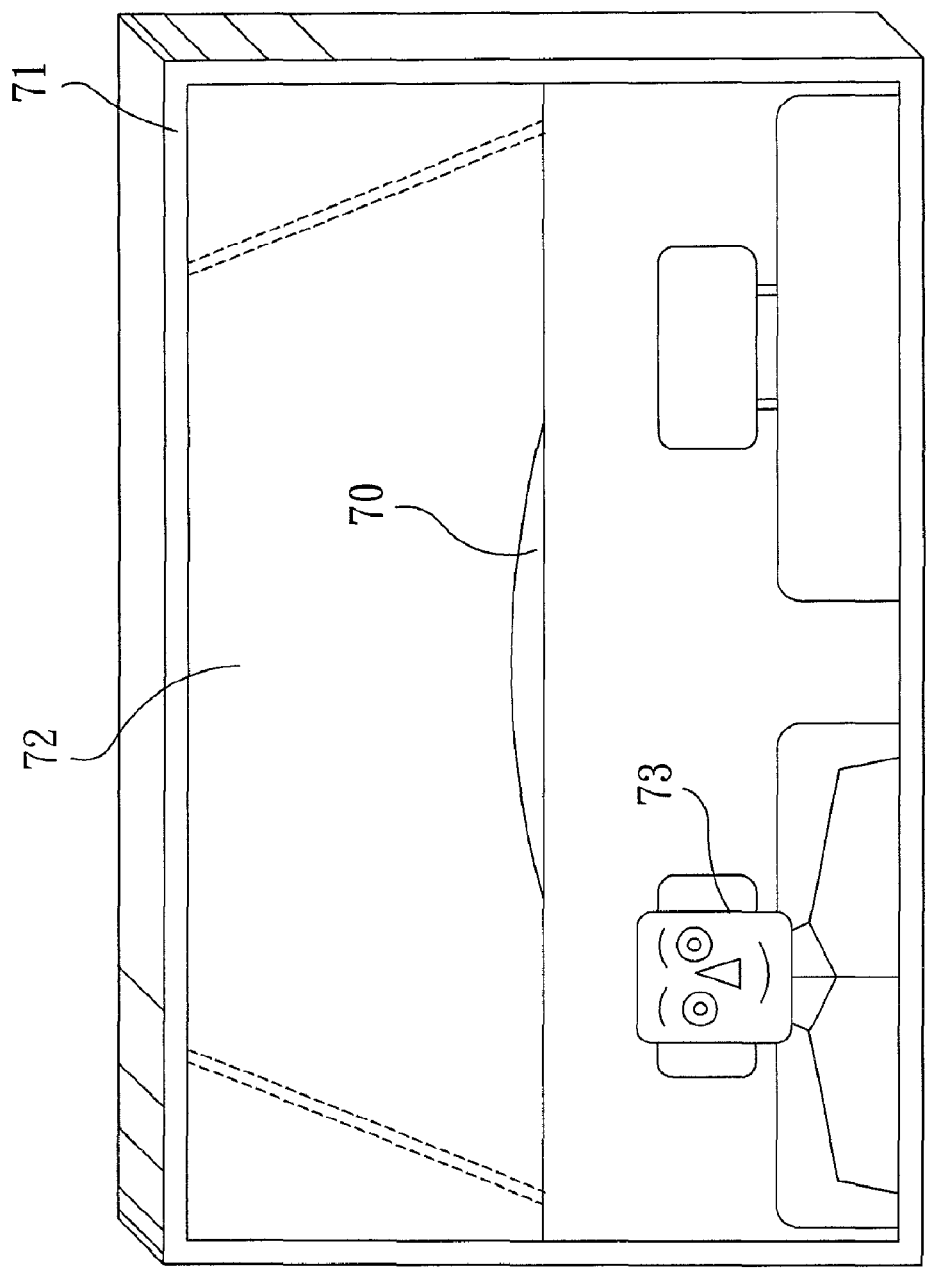
FIG. 6 schematically shows the manner in which the images acquired by the camera device of the present invention are displayed on a screen.

Please refer to FIGS. 1 to 4. A camera device capable of synchronously shooting images inside and outside a car according to the present invention includes a camera unit 10 and a mounting mechanism consisting of a mount 20 and a tightening member 30. The camera unit 10 includes a case 11, and a first and a second camera 40, 50 arranged inside and connected to the case 11. As can be seen from FIG. 5, the mount 20 includes a mounting plate 21 for fixing to a predetermined position in a car 70. The mount 20 is connected at an end to the camera unit 10, and the camera unit 10 connected to the mount 20 can be adjusted to a desired image shooting angle before being locked to that desired shooting angle by the tightening member 30. The first camera 40 of the camera unit 10 is used to acquire images of a driver 73 in the car, and the second camera 50 of the camera unit 10 is used to acquire images of a road in front of the car. The images inside and outside the car can be integrated into one picture for displaying on a screen 71, as shown in FIG. 6, so as to facilitate the determination of responsibility in case of an accident.

The case 11 of the camera unit 10 is assembled from a first half-case 111 and a second half-case 112. The first half-case 111 is provided with a first through opening 113, and the second half-case 112 is provided with a second through opening 114. The first through opening 113 is located at a front face of the case 11, while the second through opening 114 is located at a rear face of the case 11 to offset from the first through 113.

The first camera 40 is arranged in the case 11 with a lens 41 of the first camera 40 forward protruded from the first half-case 111 via the first through opening 113.

The second camera 50 is connected to an inner end of a hood 60. The hood 60 is provided at an outer end with a through opening 61, via which a lens 51 of the second camera 50 is exposed from the case 11. The hood 60 is arranged in the case 11 with the outer end of the hood 60 protruded from the case 11 via the second through opening 114. The hood 60 is symmetrically provided at two lateral ends with two sideward outward extended pins 62. Two laterally spaced partition plates 13 are provided at an inner side of the second through opening 114 on the case 11, and two recesses 131 are separately formed on the two partition plates 13 corresponding to the two pins 62. The hood 60 is arranged in the case 11 with the two pins 62 received in the two recesses 131, such that the hood 60 can be pivotally turned about the two pins 62, allowing the lens 51 of the second camera 50 to be adjusted to a desired elevation angle.

Figure 7:
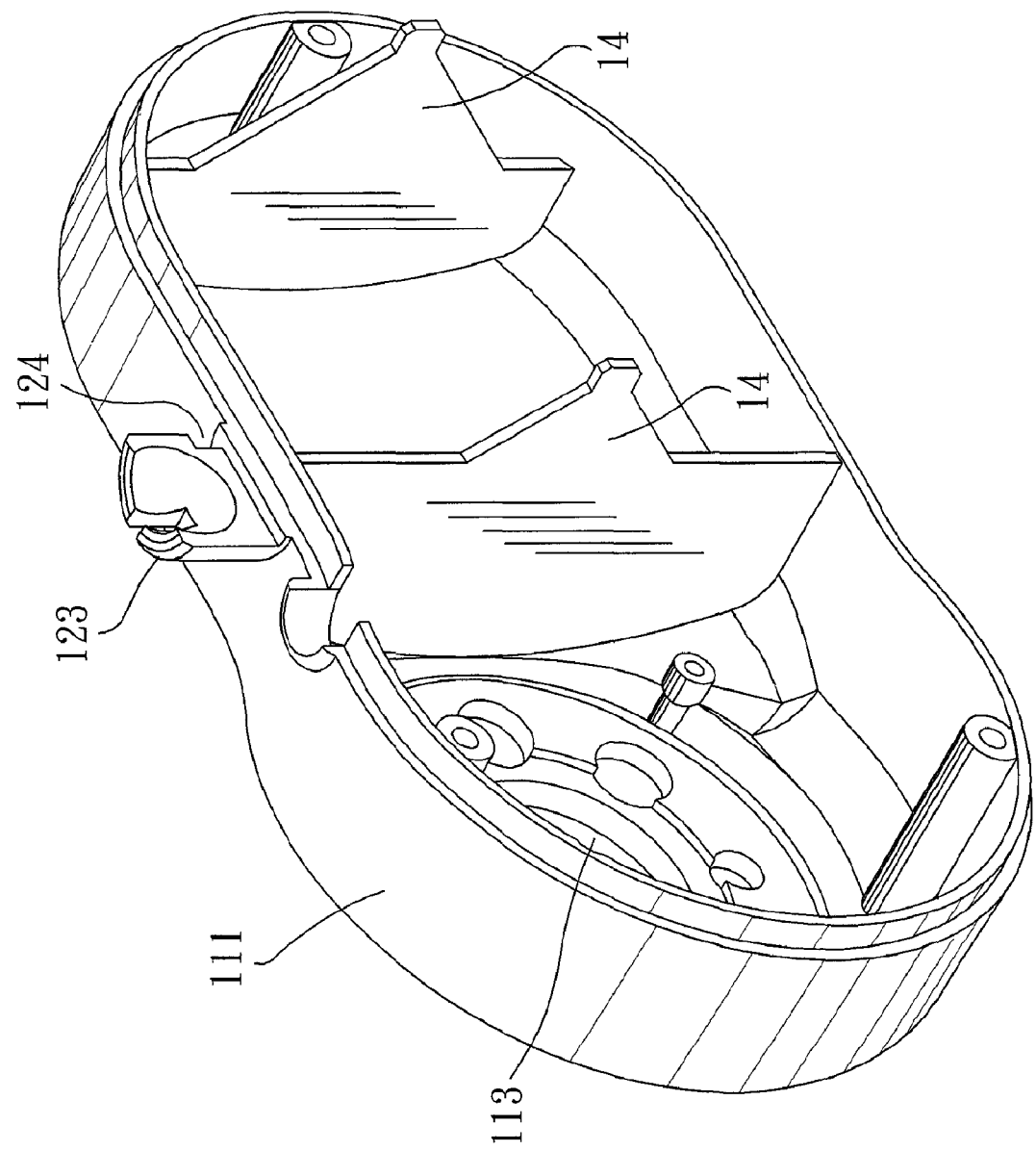
FIG. 7 is a rear perspective view of a first half-case for a camera unit of the camera device of the present invention.
Figure 8:
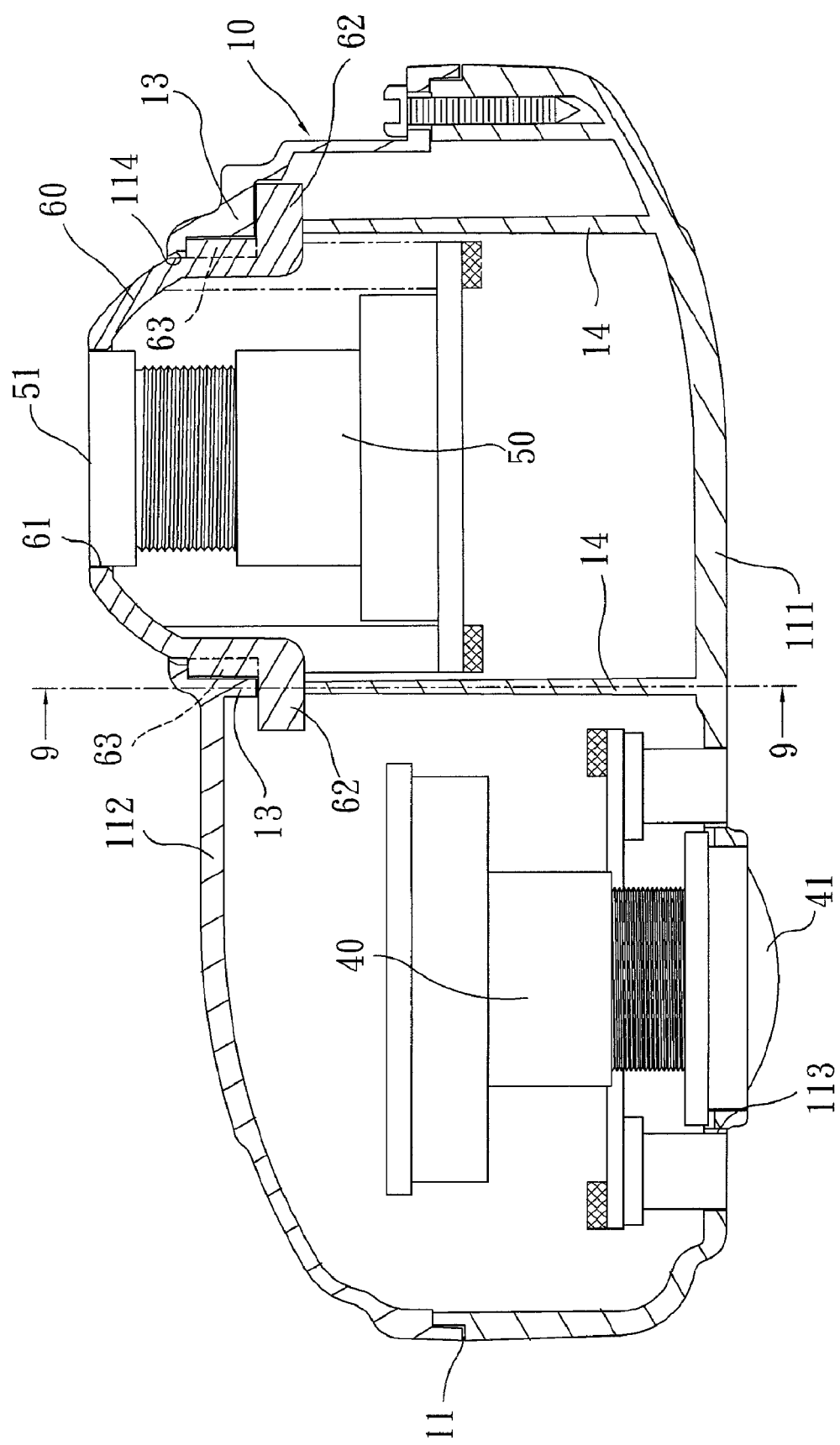
FIG. 8 is a cross-sectional view of the camera device of FIG. 1.
Figure 9:
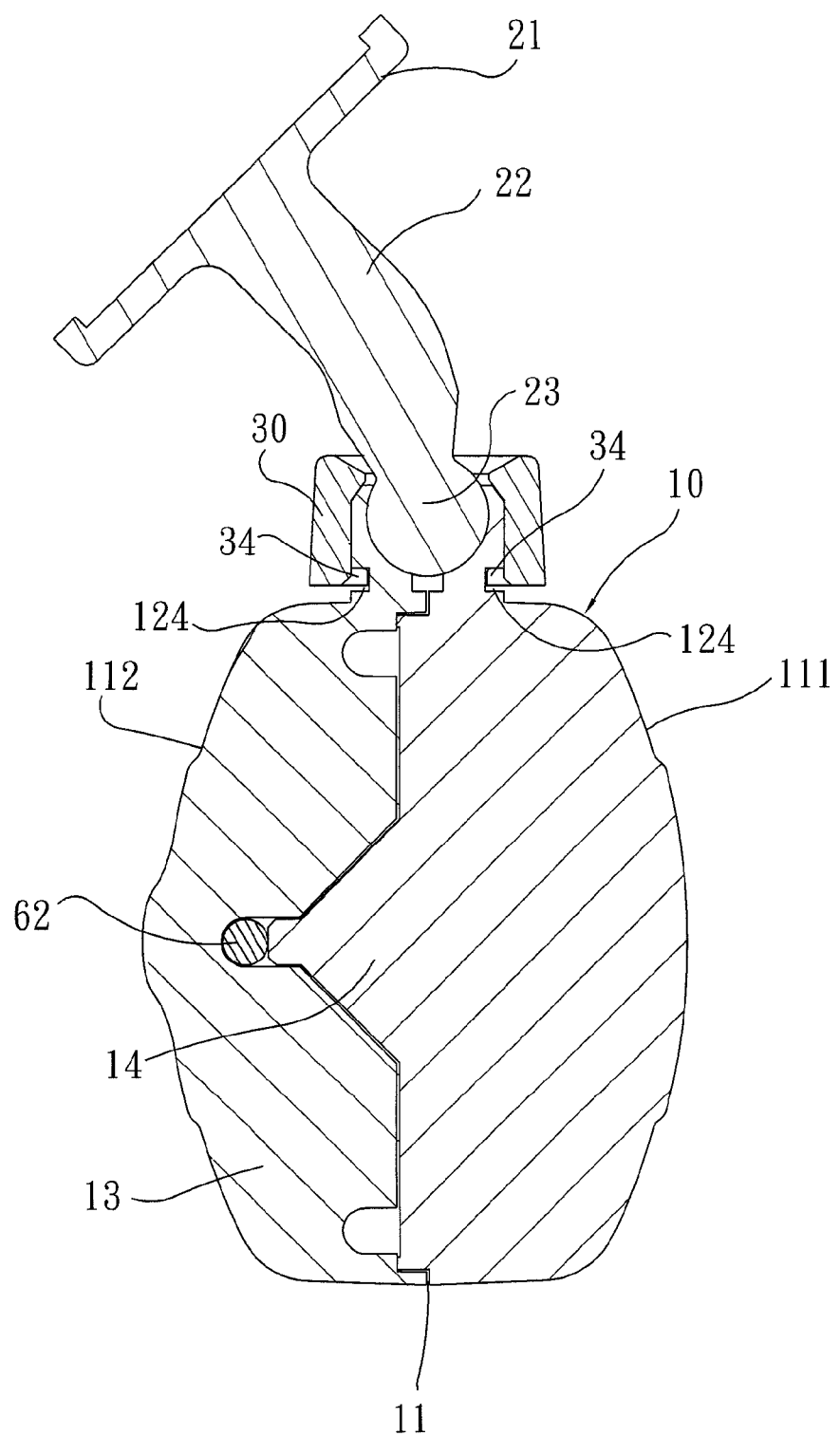
FIG. 9 is a sectional view taken along line 9-9 of FIG. 8.

Please also refer to FIGS. 7, 8 and 9. The first half-case 111 is internally provided with two rearward extended plates 14, free edges of which are separately pressed against the two pins 62, preventing the pins 62 from moving out of the recesses 131. Please refer to FIGS. 4 and 8. The hood 60 is further provided at the two lateral ends with two rearward projected engaging teeth 63 corresponding two curved toothed racks 132 provided on the inner side of the second through opening 114. The projected engaging teeth 63 can be adjustably extended into valleys formed between adjacent teeth on each of the curved toothed racks 132, so as to engage with the curved toothed racks 132. By extending the engaging teeth 63 into a selected pair of valleys on the two curved toothed racks 132, the hood 60 and accordingly the second camera 50 can be locked to a desired elevation angle without the risk of swaying easily.

In the illustrated embodiment of the present invention, the first camera 40 is an infrared camera for shooting images inside the car 70, particularly images of the driver during driving. The first camera 40 is immovably connected to the second half-case 112. And, the extended plates 14 on the first half-case 111 and the partition plates 13 on the second half-case 112 together form two complete walls in the case 11, as can be most clearly seen in FIG. 8.

The camera unit 10 is mounted on the car 70 via the mounting mechanism, which allows adjustment of the camera unit 10 to a desired orientation for shooting images. As having been mentioned above, the mounting mechanism includes a mount 20 and a tightening member 30. The mount 20 is connected at an end to the car 70, and at the other end to the case 11. The tightening member 30 can immovably lock the case 11 to the mount 20, so that the camera unit 10 is held to a selected shooting angle.

Figure 10:
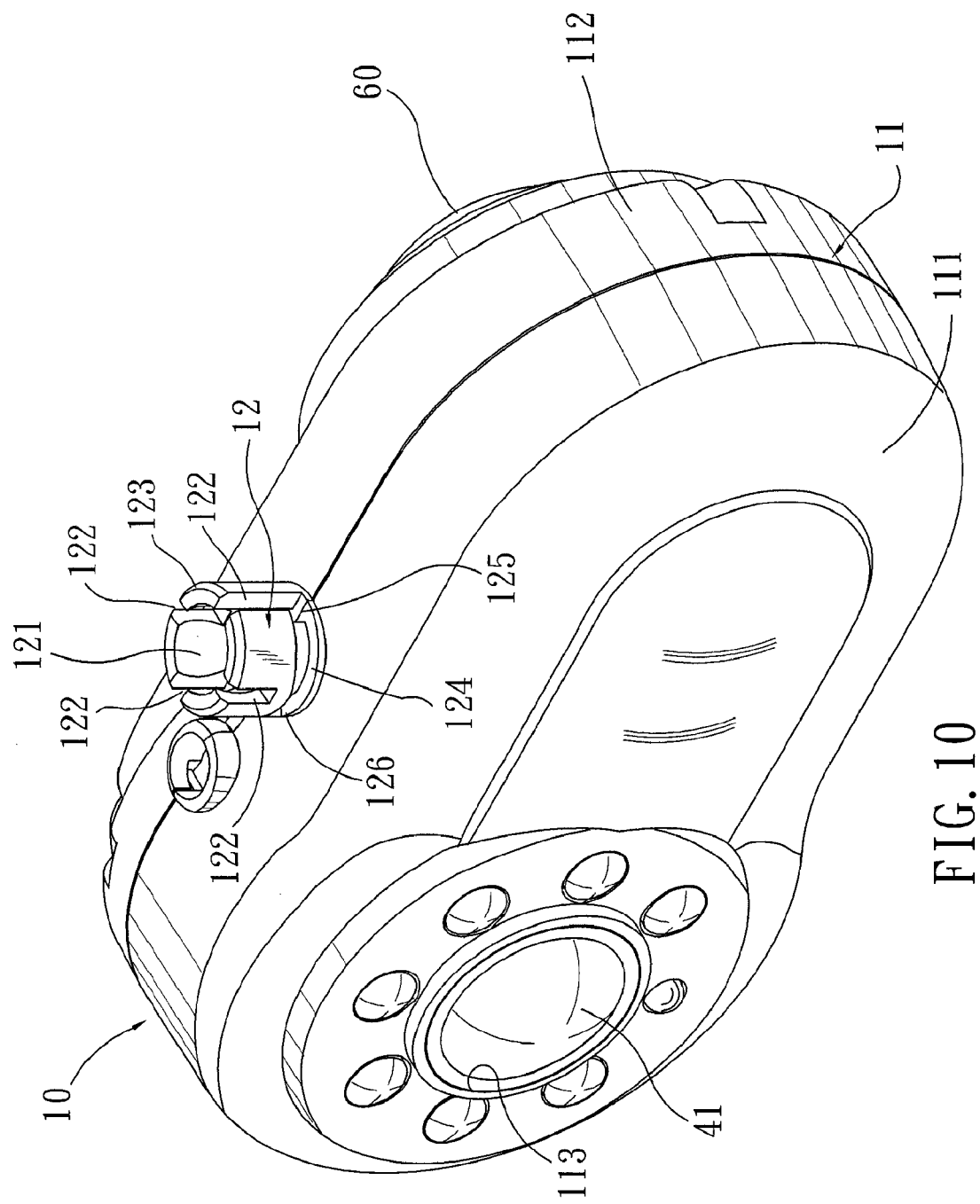
FIG. 10 is an assembled front perspective view of the camera unit of the camera device according to the present invention.

Please refer to FIG. 10 that is an assembled front perspective view of the camera unit 10. As shown, the case 11 is provided on a top with a hollow cylindrical post 12. The hollow post 12 has a hole 121 formed in an upper part thereof. The hole 121 is a spherical hole larger than a semi-sphere. The hollow post 12 is provided at the upper part with at least three spaced and axially extended slots 122 (four are shown in the illustrated embodiment), so as to provide the upper part of the hollow post 12 with some extent of inward compressibility. An upper outer peripheral edge of the hollow post 12 is beveled to form an annular sloping face 123. A root or lower part of the hollow post 12 is provided with a front and a rear guide groove 124 that are two correspondingly configured and horizontally extended grooves. It is noted each of the two grooves 124 has a leading end 125 and a tail end 126, and a top wall of the groove 124 gradually inclines from the leading end 125 toward the tail end 126.

Figure 1:
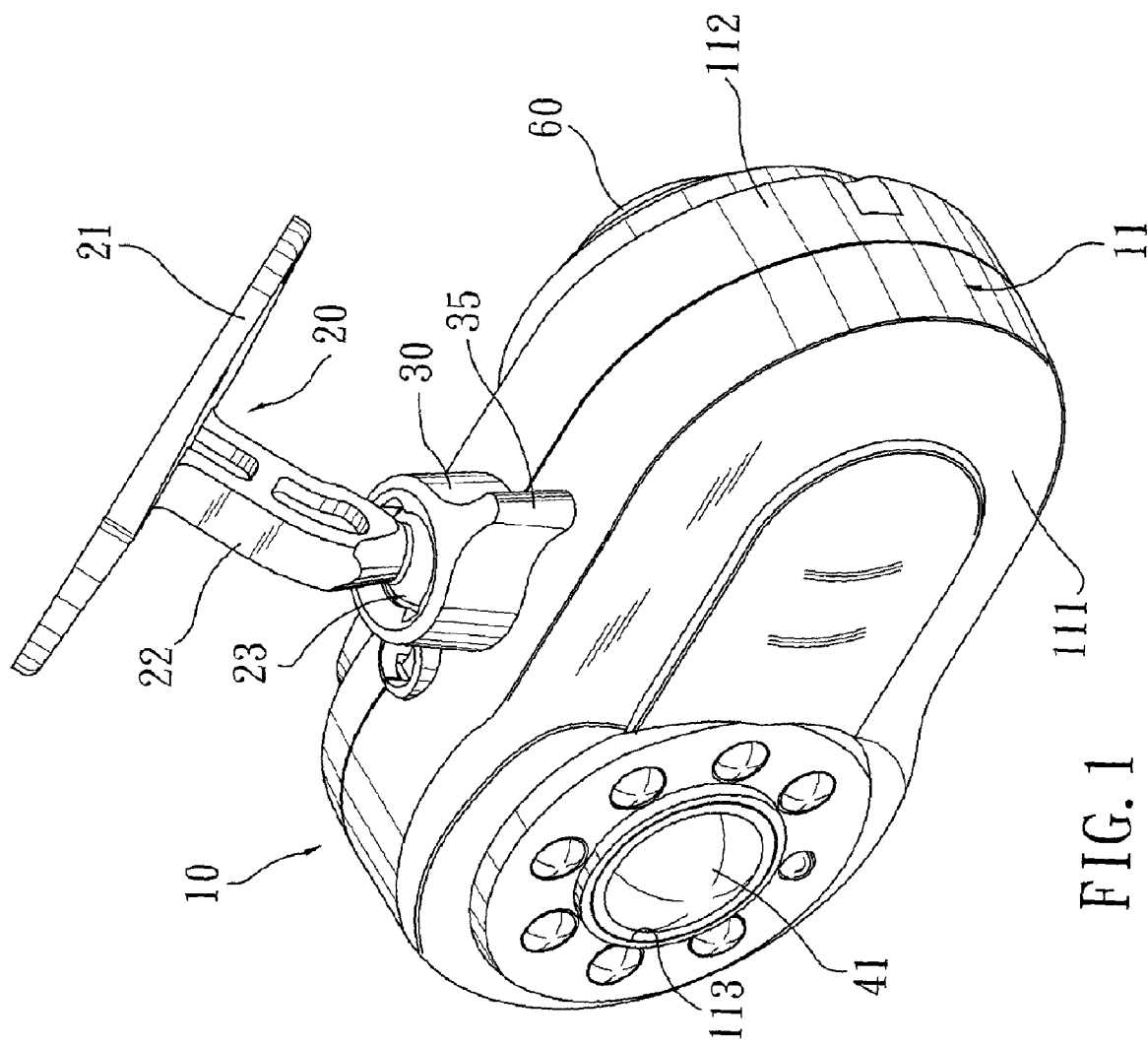
FIG. 1 is an assembled front perspective view of a camera device according to the present invention.
Figure 2:
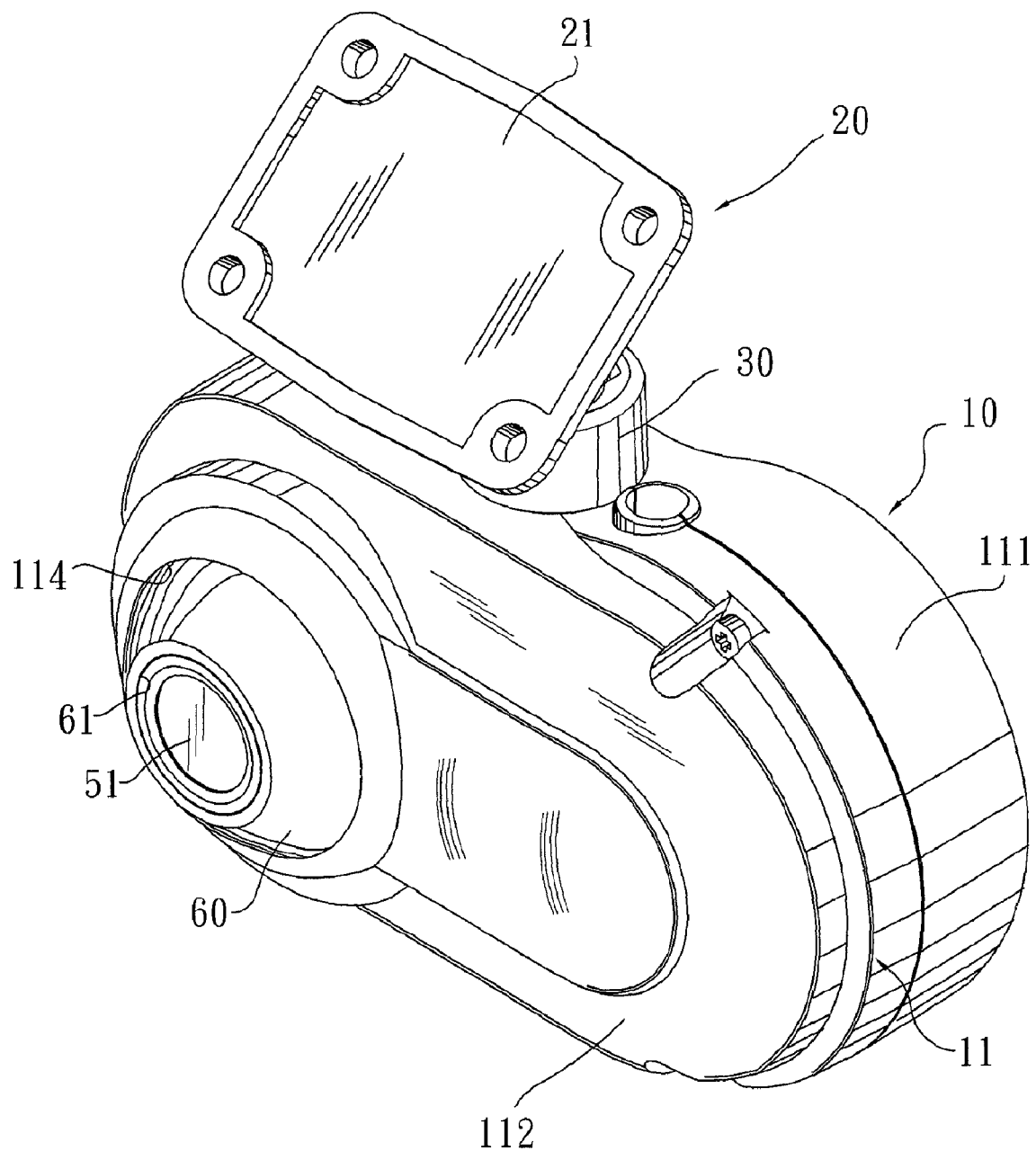
FIG. 2 is an assembled rear perspective view of the camera device of FIG. 1.
Figure 3:
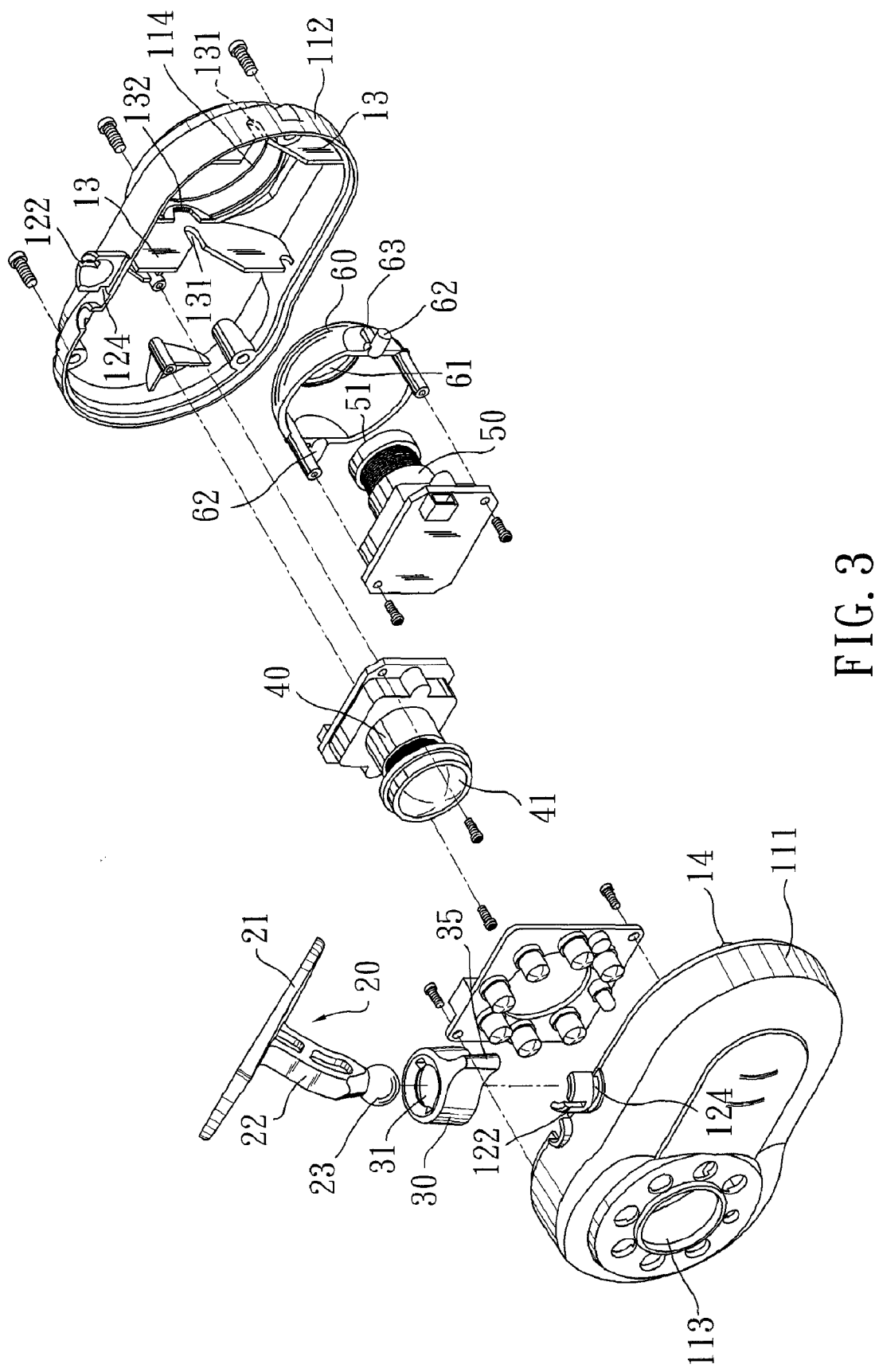
FIG. 3 is an exploded perspective view of the camera device of FIG. 1.
Figure 4:
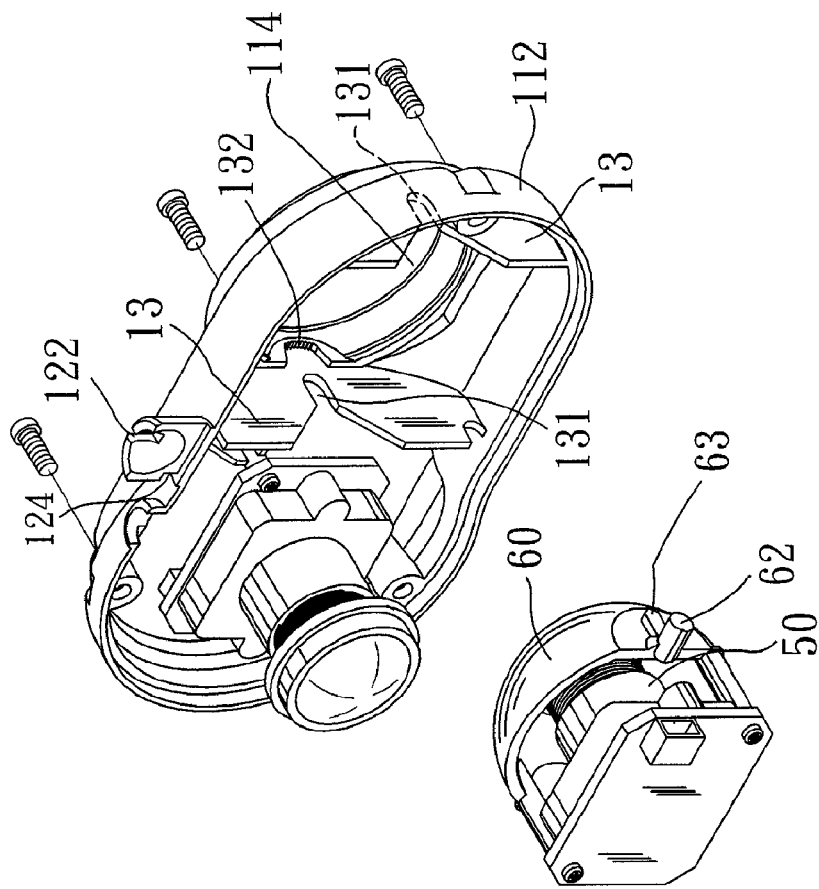
FIG. 4 is a partially assembled view of FIG. 3 with a mount mechanism removed thereof.
Figure 4:
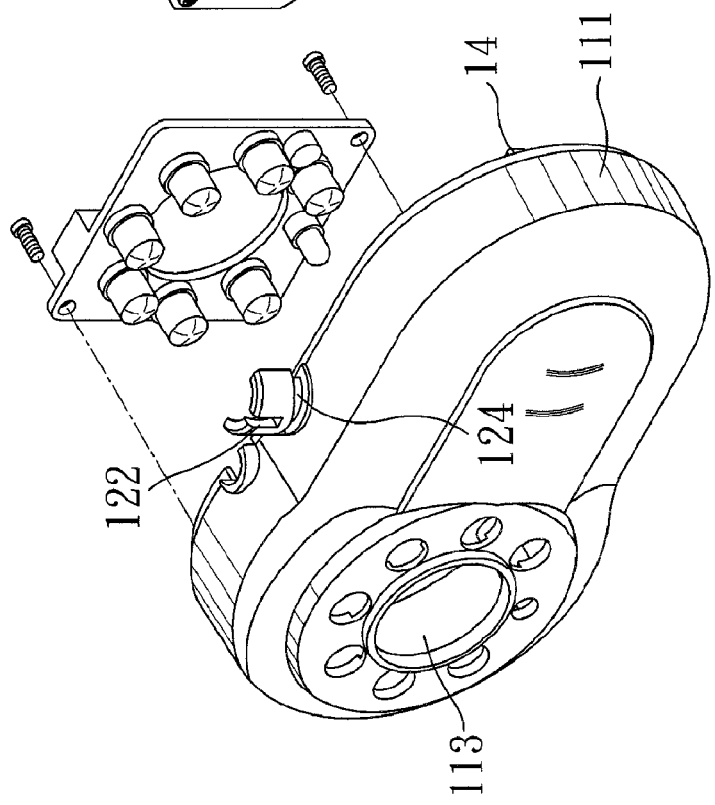

As can be seen from FIG. 3, the mount 20 includes a mounting plate 21 and a supporting arm 22, which are integrally formed into one body. A free end of the supporting arm 22 has a ball 23 connected thereto. The ball 23 is rotatably received in the hole 121 on the hollow post 12 provided on the top of the case 11 of the camera unit 10, as shown in FIGS. 11 and 12.

Figure 11:
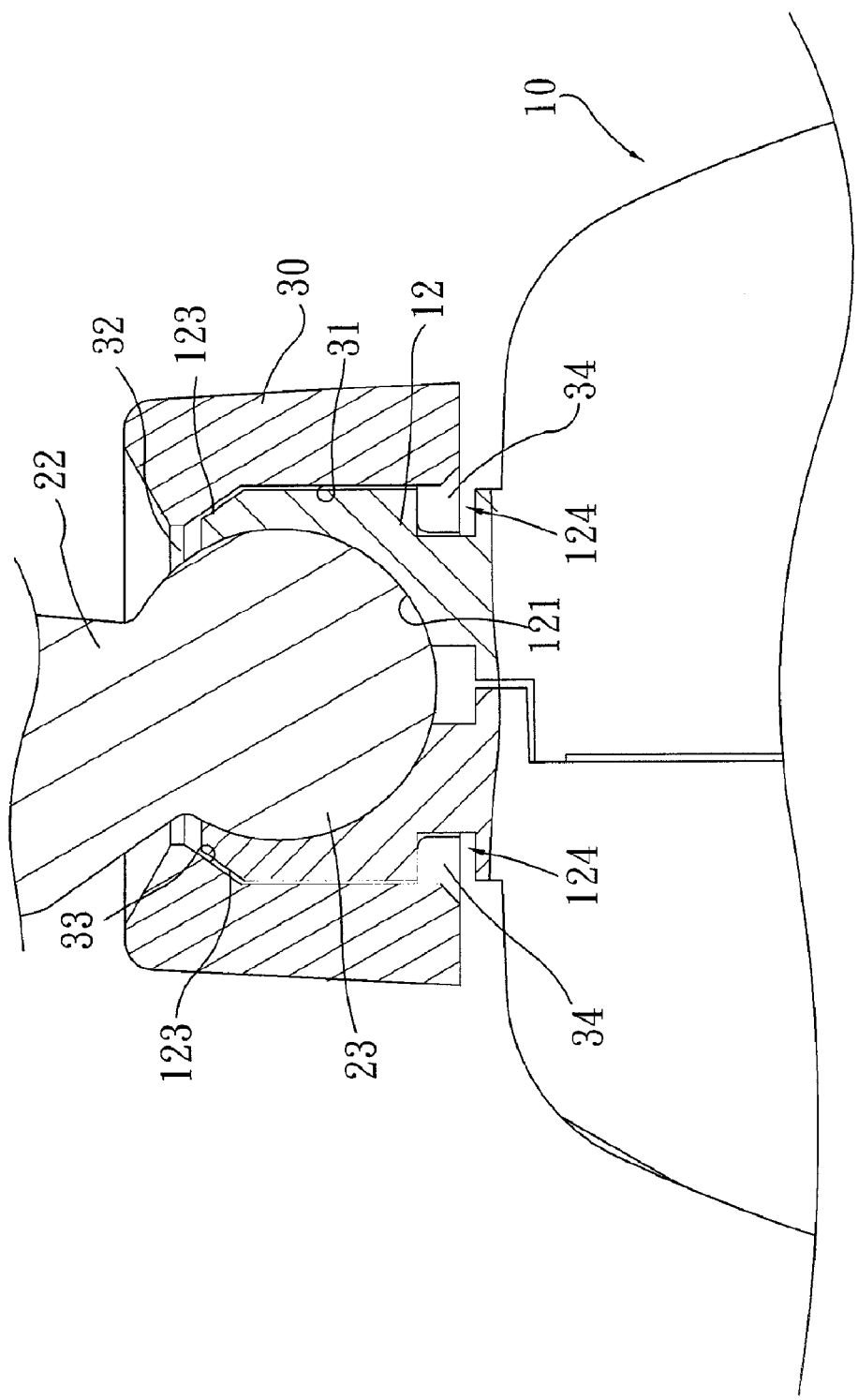
FIG. 11 is a sectional view showing a tightening member for the camera device in a loosened position.
Figure 12:
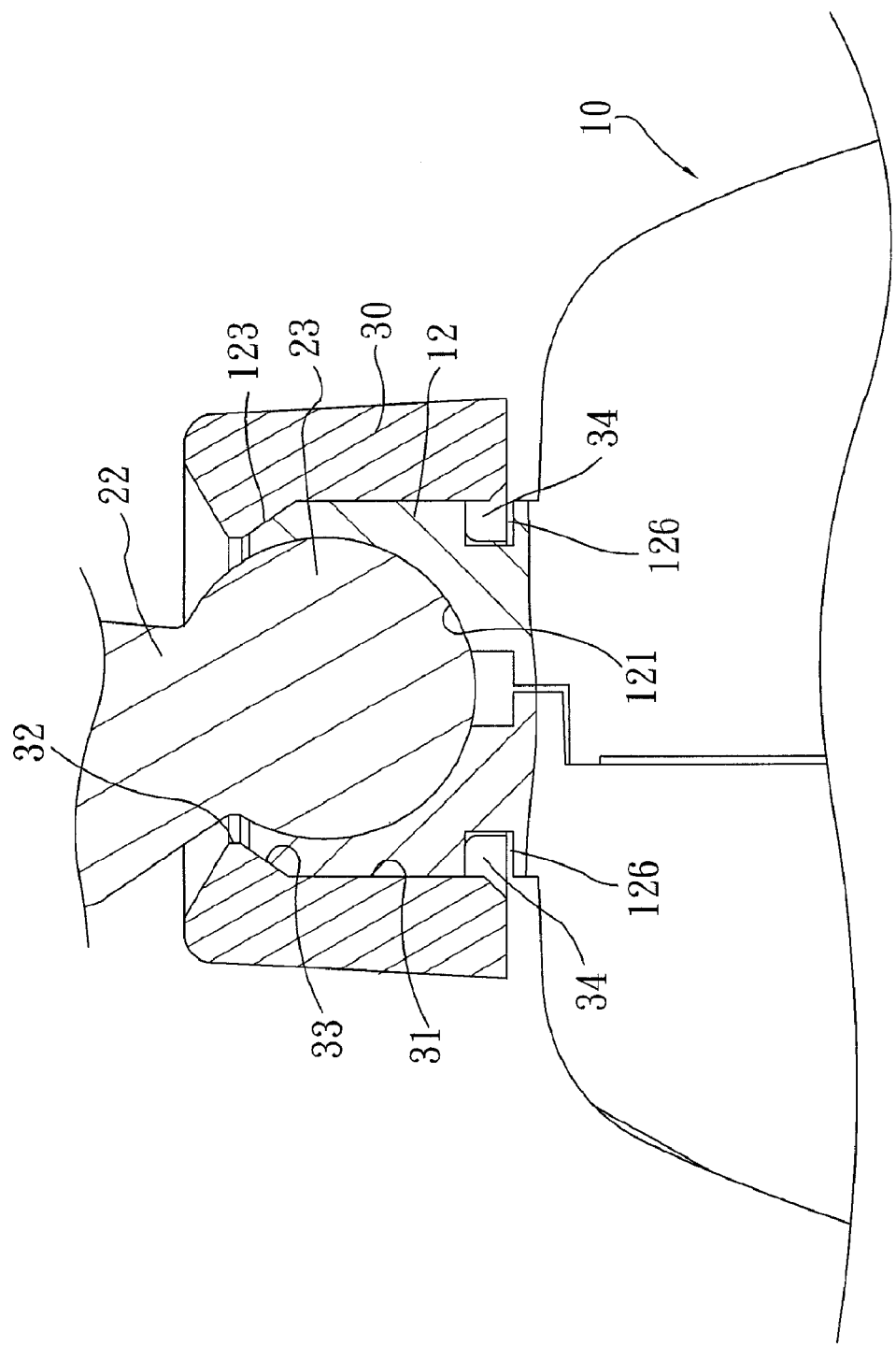
FIG. 12 is a sectional view showing the tightening member of FIG. 11 in a tightened position.

Please refer to FIG. 11. The tightening member 30 is a ring member having two open ends. It is noted a central bore 31 of the tightening member 30 is diametrically expanded from top toward bottom. An upper rim of the tightening member 30 is formed with a radially inward extended flange 32, and a lower side of the flange 32 forms an annular sloping face 33 corresponding to the annular sloping face 123 of the hollow post 12. Two radially inward protrusions 34 are correspondingly provided on a bottom of the central bore 31 at two diametrically opposite sides thereof. The tightening member 30 is externally rotatably mounted around the hollow post 12 on the top of the camera unit 10 with the two inward protrusions 34 separately extending into the front and the rear guide groove 124 at the root of the hollow post 12. When turning the tightening member 30 for the inward protrusions 34 to slide in the two guide grooves 124 from the leading ends 125 to the tail ends 126, the tightening member 30 is forced downward by the inclined top walls of the guide grooves 124. At this point, the downward expanded central bore 31 of the tightening member 30 would apply a compressive force against the upper part of the hollow post 12, and the annular sloping face 33 at the lower side of the flange 32 would press against the annular sloping face 123 at the upper end of the hollow post 12, bringing the hollow post 12 to tightly clamp on the ball 23, as shown in FIG. 12. As a result, the ball 23 in the central bore 31 is immovable relative to the hollow post 12 and accordingly, the camera unit 10 is firmly held to a desired shooting angle. The tightening member 30 further includes a handle 35, via which a user can conveniently turn the tightening member 30 with only one single hand.

When it is desired to adjust the orientation of the lens 41, 51 of the first and the second camera 40, 50, respectively, first turn the tightening member 30 to slide the inward protrusions 34 along the guide grooves 124 toward the leading ends 125 thereof, as shown in FIG. 11. At this point, the tightening member 30 is moved upward relative to the hollow post 12, and the hollow post 12 no longer clamps on the ball 23, allowing the camera unit 10 to be adjusted to a desired horizontal angle within a range of 360 degrees and to a desired elevation angle within a range of 45 degrees. When the camera unit 10 has been adjusted to the desired angular position, a user can hold the camera unit 10 with one hand while turning the tightening member 30 with the other hand, so that the tightening member 30 compresses against the hollow post 12 and the hollow post 12 tightly clamps on the ball 23 again. In the process of tightening, since the camera unit 10 is held by the user's hand without the risk of moving, the adjustment can be more accurately performed.

With the above arrangements, the camera unit 10 can synchronously shoot the images of the driving state of the driver in the car and the images of the road in front of the car. In case of an accident, the shot driver and road images are helpful in finding out whether the driver has concentrated his attention on driving or whether the accident is caused due to negligence of the injured person or damaged car, so as to determine the real party that should be responsible for the accident. Moreover, in the present invention, the camera unit 10 is locked by the tightening member 30 to a desired shooting angle, and the tightening member 30 can be manipulated by the driver with only one hand. Therefore, the design of the camera device of the present invention completely meets most drivers' habitual action to adjust in-car devices with one hand, making the present invention ideal for use.

What is claimed is:

1. A camera device capable of synchronously shooting images inside and outside a car, comprising:
    a case assembled from a first and a second half-case; the first half-case being provided with a first through opening, and the second half-case being provided with a second through opening; the first through opening being located at a front face of the case while the second through opening being located at a rear face of the case; the first and the second through opening are offset from each other; two laterally spaced partition plates being provided at an inner side of the second through opening; and two recesses being separately formed on the two partition plates;
    a first camera being arranged in the case for acquiring images inside the car; and the first camera having a lens protruded from the first half-case via the first through opening;
    a hood being arranged in the case and having an outer end, which is protruded from the second half-case via the second through opening and provided with a through opening; the hood being symmetrically provided at two lateral ends with two sideward outward extended pins corresponding to the two recesses on the partition plates on the case; and the hood being arranged in the case with the two pins received in the two recesses, such that the hood can be pivotally turned about the two pins; and
    a second camera being fitted to an inner end of the hood for acquiring images in front of the car, and the second camera having a lens exposed from the hood via the through opening thereof.

2. The camera device as claimed in claim 1, wherein the first camera is an infrared camera.

3. The camera device as claimed in claim 1, wherein the first half-case is internally provided with two rearward extended plates, free edges of which being separately pressed against the two pins on the hood, preventing the pins from moving out of the recesses on the partition plates.

4. The camera device as claimed in claim 1, wherein the hood is further provided at the two lateral ends with two rearward projected engaging teeth, and the second half-case is provided at an inner side of the second through opening with two curved toothed racks corresponding to the two engaging teeth; and the two engaging teeth being adjustably extended into any selected pair of valleys formed between adjacent teeth on each of the curved toothed racks, allowing the hood to be adjusted to a desired elevation angle through engagement of the engaging teeth with the valleys on the curved toothed racks.

5. The camera device as claimed in claim 1, further comprising a mounting mechanism which allows adjustment of the camera unit to a desired orientation; the mounting mechanism including a mount and a tightening member, the mount being connected at an end to an inner side of the car and at the other opposite end to the case; and the tightening member being used to lock the case in place when the case has been connected to the mount and adjusted to a desired angular position.

6. The camera device as claimed in claim 5, wherein the case is provided on a top with a cylindrical hollow post, the hollow post having a hole formed in an upper part thereof and the hole being a spherical hole larger than a semi-sphere; the hollow post also being provided at the upper part with at least three spaced and axially extended slots, so as to provide the upper part of the hollow post with some extent of inward compressibility; a root or lower part of the hollow post being provided with a front and a rear guide groove that are two correspondingly configured and horizontally extended grooves; each of the two grooves having a leading end and a tail end, and a top wall of the groove gradually inclining from the leading end toward the tail end; and wherein the tightening member is a ring member having two open ends and has a central bore diametrically expanded from top toward bottom, two radially inward protrusions being correspondingly provided on a bottom of the central bore at two diametrically opposite sides thereof; and the tightening member being externally rotatably mounted around the hollow post on the case with the two inward protrusions separately extending into the front and the rear guide groove at the root of the hollow post; whereby when the tightening member is turned for the inward protrusions to slide in the two guide grooves from the leading ends to the tail ends, the tightening member is forced downward by the inclined top walls of the guide grooves and the central bore of the tightening member applies a compressive force against the upper part of the hollow post.

7. The camera device as claimed in claim 6, wherein an upper outer peripheral edge of the hollow post is beveled to form an annular sloping face, and an upper rim of the tightening member is formed with a radially inward extended flange, which has a lower side formed into an annular sloping face adapted to press against the annular sloping face of the hollow post.

8. The camera device as claimed in claim 7, wherein the tightening member is provided with a handle.

* * * * *